Dec. 26, 1922.
L. N. VINCENT.
GREASE CUP.
FILED OCT. 5, 1921.
1,439,853
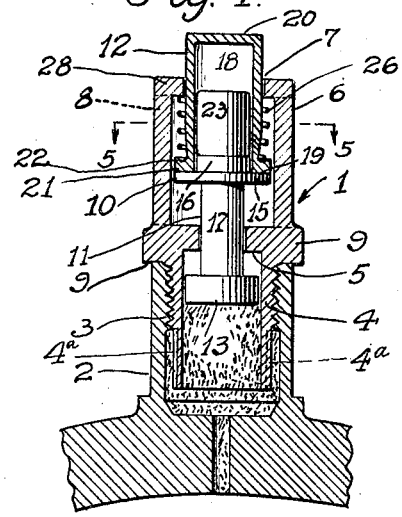
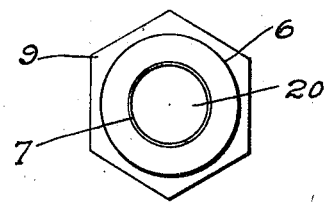
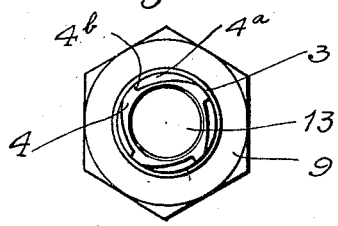
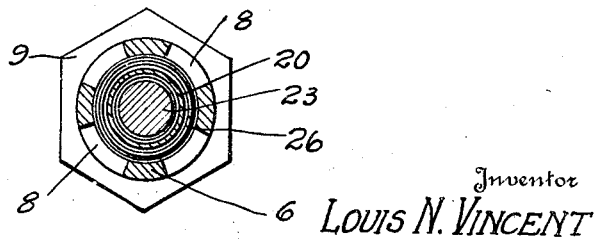
Inventor
LOUIS N. VINCENT
By Blackwood Bros,
Attorneys.

Patented Dec. 26, 1922.

1,439,853

UNITED STATES PATENT OFFICE.

LOUIS N. VINCENT, OF SEATTLE, WASHINGTON, ASSIGNOR TO IMPERIAL STEAM APPLIANCE COMPANY, OF SEATTLE, WASHINGTON, A CORPORATION.

GREASE CUP.

Application filed October 5, 1921. Serial No. 505,489.

*To all whom it may concern:*

Be it known that I, LOUIS N. VINCENT, a citizen of the United States, residing at Seattle, in the county of King, State of Washington, have invented certain new and useful Improvements in Grease Cups; and I do declare the following to be a full, clear, and exact description of the invention, such as will enable others skilled in the art to which it pertains to make and use same.

My invention relates to improvements in grease cups and more particularly to that class of grease cups adapted for use on the moving parts of machinery, such for instance, as the connecting rods of a locomotive. The invention consists in the several features and in the construction, combination and arrangement of features as more fully hereinafter described and claimed.

It has for its object to provide means for automatically feeding the grease by means of the movement or motion of that portion of the machinery on which it is mounted.

It further has for its object to provide means whereby in the event of any grease passing the piston it will pass out of the cup through the openings provided for that purpose instead of remaining in the cup thus obviating the use of packing rings.

It further has for its object to provide for regulating the feeding of the grease either by the weight of the hammer or by the distance traveled by the same.

It further has for its object to provide a grease cup in which all the moving parts are enclosed so that they will not be liable to be bent, broken or mutilated.

It further has for its object to provide a follower or piston which cannot be accidentally displaced after it is once placed in position.

It further has for its object to provide a grease cup with means whereby the engineer is enabled to always know the exact amount of grease in the cup obviating the necessity of removing the cup for refilling before it is empty.

It still further has for its object to provide a grease cup which is exceedingly simple, inexpensive and durable in construction and very convenient and effective in use.

Referring to the drawings:—

Figure 1 is a central vertical sectional view of my invention shown in the position it assumes when in use.

Figure 2 is a top plan view of the upper part of the follower or piston.

Figure 3 is a top plan view of the lower part of the follower or piston.

Figure 4 is a top plan view of the weight.

Fig. 5 is a horizontal sectional view taken on line 5—5 of Fig. 1.

In the drawings, in which similar reference characters denote similar parts throughout the several views, 1 represents my improved grease cup made preferably cylindrical in form, but which may be made of any desired shape, form or contour, adapted to receive grease or other lubricant from the grease receptacle 2 which is provided with suitable interior screwthreads 3.

The grease cup 1 comprises a lower hollow screw-threaded portion 4, below which are formed a series of tapering recesses $4^a$, each terminating in a shoulder $4^b$, the portion 4 being adapted to be screwed into and engage the interior screwthreads 3 of the grease receptacle 2; having an annular interior shoulder 5, a hollow cylindrical upper portion 6 having a central opening 7, a series of lateral sight holes 8, through which the amount of grease in the cup may be ascertained, and an annular exterior shoulder or flange 9 at its middle portion.

The shoulder 9 being adapted to be seated on the upper edge of the grease receptacle.

The purpose of the tapering recesses $4^a$ and the shoulders $4^b$ is to allow the grease to pack in the recesses and against the shoulders, and retard and prevent the grease cup from being accidentally unscrewed from the grease receptacle by the jarring or pounding of the driving rod or other piece of machinery on which the grease cup is mounted.

A follower or piston 10 is provided made in two parts, a lower part 11 and an upper part 12. The lower part 11, which is slidably mounted in the interior of the hollow screwthreaded portion 4 of the grease cup, comprises a head 13 at its lower end, a flange 15 at its upper end having an upwardly extending central projection 16 and a reduced portion of stem 17 intermediate the flange and head.

The upper part 12 of the two part follower or piston, is slidably mounted in the central opening 7 of the cylindrical upper portion of the grease cup, comprises an interior chamber 18 open at the bottom 19 and closed at the top 20, an annular exterior flange 21 extending laterally from its lower end and provided with an annular groove 22 in its upper surface.

A weight 23, which constitutes a hammer, is loosely mounted in the chamber 18 of the upper part 12 of the follower or piston and is adapted to be reciprocated up and down within the chamber by means of the vibration or movement of the moving part of the driving rod or other moving machinery on which the grease cup is mounted for the purpose of pressing the grease downward and feeding the same.

The projection on the lower part 11 of the follower or piston extends into and closely fits the interior chamber 18 and the two parts of the follower move together as one piece when in operation.

A continuous downward pressure is maintained and exerted on the grease or lubricant in the grease receptacle by means of the weight 23 and a coiled spring 26 which is mounted on and surrounds the upper part 12 of the follower or piston, the lower end being seated in the groove 22 of the flange 21 and the upper end being seated against an interior flange 28 on the upper portion 6 of the grease cup.

This spring 26 also serves to keep the two parts of the follower or piston in close contact.

If a weight becomes broken or if it is desired to introduce a weight of greater or less weight than the one in use it is only necessary to insert a knife or other tool under the lower edge of the upper part of the follower or piston and raise the same, against the pressure of the coiled spring, sufficiently to allow the weight to be dropped out of the chamber 18 and then insert another weight of the size and weight desired and allow the spring to return the upper part of the follower or piston to its normal position again in contact with the lower part of the follower or piston. Any grease which may accidentally pass the piston will flow or be thrown out through the holes 8 and therefore no packing between the two parts of the follower or piston is necessary.

In operation the grease is placed in the grease receptacle, the grease cup carrying the follower or piston screwed in place therein and as the grease cup is vibrated or reciprocated by the motion of the moving part of the driving rod or other machinery on which it is mounted, the weight or hammer is caused to reciprocate up and down in the chamber of the upper part of the follower or piston and as it strikes or knocks against the top of the lower part of the follower or piston it causes such lower part to exert a downward pressure on the grease and causes the grease to be fed or expelled through the feed hole or channel leading to the bearing.

I do not wish to be understood as limiting myself to the specific details of construction and arrangement as herein described and illustrated, as it is manifest that variations and modifications may be made in the features of construction and arrangement in the adaptation of the device to various conditions of use without departing from the spirit and scope of my invention and improvements. I, therefore, reserve the right to all such variations and modifications as properly fall within the scope of my invention and the terms of the following claims.

What I claim is:

1. In a grease cup, a grease receptacle, a two part follower, one of said parts provided with a chamber and the other part solid, a reciprocable weight mounted in said chamber, said two parts of the follower contacting but being disconnected, and resilient means for holding them in contact with each other.

2. In a grease cup, a lower portion having a grease receptacle, an upper portion having lateral openings, and an opening at the top, a two part follower, one of said parts being mounted in the grease receptacle and having a stem with a flange and the other part mounted in the upper portion of the grease cup and provided with a chamber and a flange, reciprocable means in said chamber for exerting pressure on the follower and spring means for keeping the flanges of the two parts of the follower in contact said spring means mounted between the top of the upper portion of the grease cup and the said flange of the follower.

3. In a grease cup, a lower portion having a grease receptacle, an upper portion having lateral openings and an opening at the top, a two part follower, the upper part provided with a chamber and a flange, and mounted in the said opening at the top, and the lower part being solid and provided with a projection extending into said chamber, reciprocable means in said chamber for exerting pressure on the follower and spring means for keeping the two parts of the follower in contact.

4. In a grease cup, a lower portion having a grease receptacle, an upper portion having lateral openings and an opening at the top, a two part follower the lower part of said follower mounted in the grease receptacle of the cup and provided with a flange and a projection at the upper end and a head at the lower end, and the upper part of said follower mounted in the opening in the top of the grease cup and provided with a flange and with an interior chamber in which the projection on the lower part of the follower is seated a weight in said chamber and a spring mounted between the flange of the upper part of the follower and the top of the upper portion of the grease cup.

5. In a grease cup, a grease receptacle, a two part follower, said parts contacting but being disconnected, one of said parts provided with a chamber, reciprocable means therein for exerting pressure on said follower and means for keeping the parts of the follower in contact.

6. In a grease cup, a grease receptacle, a two part follower one of said parts provided with a chamber, a flange and a groove in said flange, the other part provided with a head, a flange, and a projection seated in the lower end of said chamber, a reciprocable weight in said chamber and a spring one end seated in the groove of the first named part of the follower and the other end seated against the top of the grease cup.

7. A grease cup adapted to engage a casing, said grease cup provided with a plurality of vertical tapering recesses for engaging the grease to prevent the cup from being dislodged from the grease receptacle.

8. In a grease cup adapted to engage a casing, a lower portion provided with vertical substantially wedge-shaped recesses between the cup and casing and shoulders for engaging the grease to prevent the cup from being dislodged from the grease receptacle.

In testimony whereof I have affixed my signature.

LOUIS N. VINCENT.